United States Patent [19]

Castel et al.

[11] Patent Number: 5,154,106
[45] Date of Patent: Oct. 13, 1992

[54] PNEUMATIC BRAKE BOOSTER OF THE TANDEM TYPE

[75] Inventors: Philippe Castel, Paris; Pierre Pressaco, La Courneuve, both of France

[73] Assignee: Bendix Europe Services Techniques, Drancy, France

[21] Appl. No.: 716,164

[22] Filed: Jun. 17, 1991

[30] Foreign Application Priority Data

Jun. 29, 1990 [FR] France .................. 90 08220

[51] Int. Cl.⁵ .................... F01B 19/02; F15B 9/10
[52] U.S. Cl. ............................... 92/48; 92/99; 91/369.2; 91/376 R
[58] Field of Search ............ 91/369.1, 369.2, 369.3, 91/376 R; 92/48, 49, 96, 98 R, 99, 100; 60/550, 582

[56] References Cited

U.S. PATENT DOCUMENTS

| 2,989,035 | 6/1961 | Stelzer | 92/48 |
|---|---|---|---|
| 3,897,718 | 8/1975 | Gardner et al. | 91/411 |
| 4,173,172 | 11/1979 | Ohmi | 91/369.1 |
| 4,345,506 | 8/1982 | Ohomi | 92/99 |
| 4,495,854 | 1/1985 | Hibino | 91/438 |
| 4,516,474 | 5/1985 | Ochiai | 92/48 |
| 4,882,980 | 11/1989 | Arino et al. | 91/369.2 |
| 5,046,398 | 9/1991 | Hamamiya et al. | 91/369.2 |

FOREIGN PATENT DOCUMENTS

| 1576060 | 8/1969 | Fed. Rep. of Germany . |
|---|---|---|
| 2436144 | 2/1975 | Fed. Rep. of Germany . |
| 2431623 | 2/1980 | France . |
| 0088472 | 8/1978 | Japan | 92/48 |
| 0115472 | 10/1978 | Japan | 92/48 |
| 0152656 | 11/1980 | Japan | 92/48 |

Primary Examiner—Edward K. Look
Assistant Examiner—Hoang Nguyen
Attorney, Agent, or Firm—Larry J. Palguta; Ken C. Decker

[57] ABSTRACT

A pneumatic brake booster of the tandem type for the brake boosting of motor vehicles, comprises a movable hub (15) driving a push rod (11) by of a reaction disk (17), a closed containment composed of a front shell (1) on the same side as the master cylinder and of a rear shell (3) on the same side as the actuating pedal, which define a front chamber and a rear chamber separated by a separating element (5) having an annular partition (9), and a front piston (25) and a rear piston (35) respectively arranged coaxially in the front and rear chambers. These chambers are themselves respectively divided by a sealing diaphragm (27, 37) fixed to each of the pistons (25, 35), in order to define, within each of these, a sub-chamber of constant pressure (21, 31) and a sub-chamber of variable pressure (23, 33), the pistons (25, 35) being movable in the axial direction under the effect of the differences in the pressures prevailing between the sub-chambers of each chamber. The annual partition (9) of the separating element (5) is simply put in place and bears on the bottom of the rear shell (3) of the containment, and the pistons (25, 35) are fixed to one another and to the movable hub (15).

6 Claims, 1 Drawing Sheet

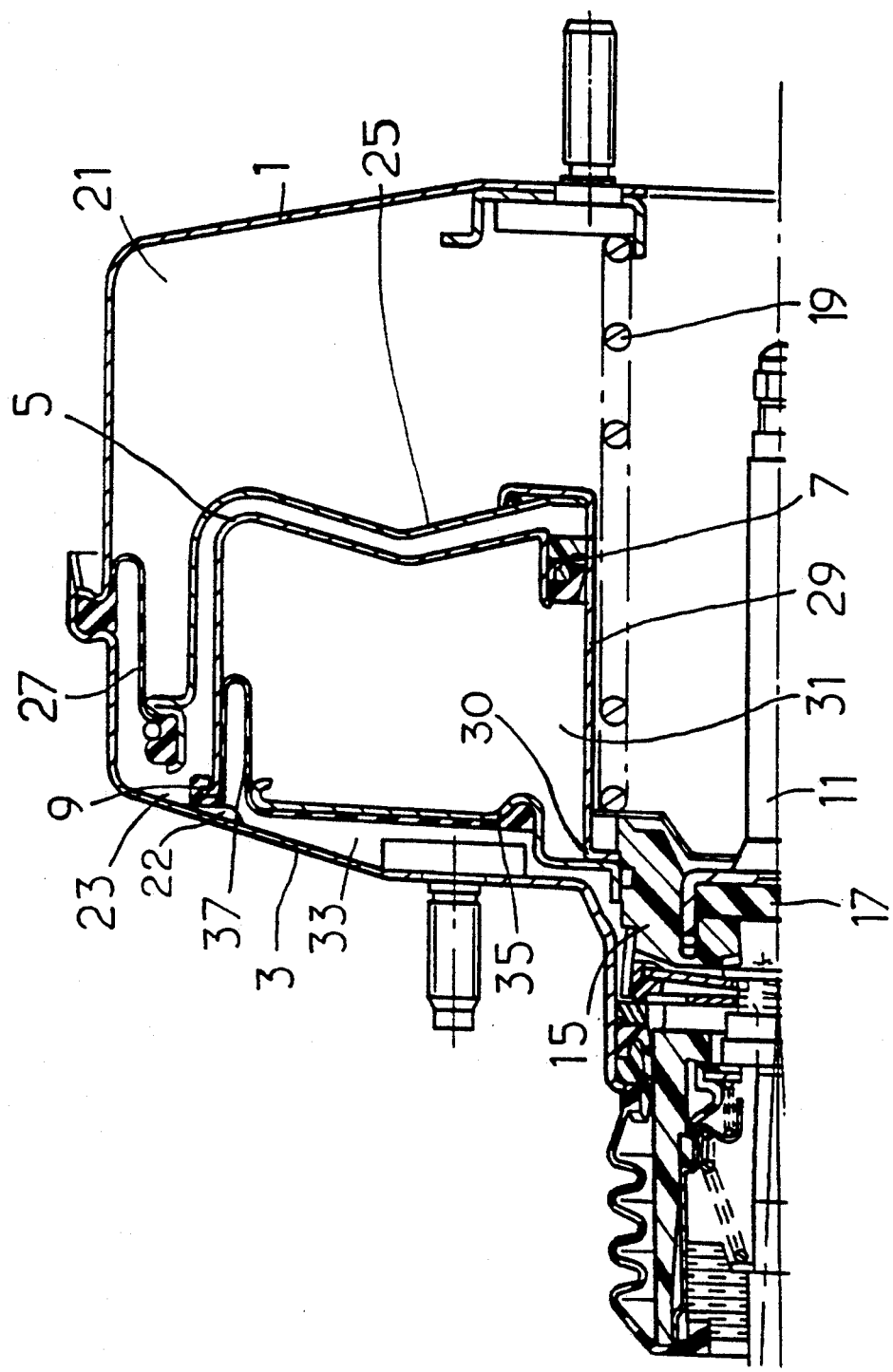

PNEUMATIC BRAKE BOOSTER OF THE TANDEM TYPE

BACKGROUND OF THE INVENTION

The present invention relates to pneumatic brake boosters of the tandem type for the brake boosting of motor vehicles.

Pneumatic brake boosters of the tandem type are well known to an average person skilled in the art, since, in general terms, they make it possible to increase the brake boosting force, without appreciably increasing the outside diameter of the brake booster.

For example, the document U.S. Pat. No. 4,494,445 describes such a brake booster comprising a movable hub driving a push rod by means of a reaction disk, a closed containment composed of a front shell on the same side as the master cylinder and of a rear shell on the same side as the actuating pedal, both having a bottom and a cylindrical ring, defining a front chamber and a rear chamber separated by a separating element having an annular partition, and a front piston and a rear piston, respectively arranged coaxially in the front and rear chambers which are themselves divided respectively by a sealing diaphragm fixed to each of the pistons in order to define, within each of these, a sub-chamber of constant pressure and a sub-chamber of variable pressure, the pistons being movable in the axial direction under the effect of the differences in the pressures prevailing between the sub-chambers of each chamber.

Such a booster has a considerable disadvantage in that, when air is admitted into the sub-chamber of variable pressure of the front chamber, the difference between the pressure prevailing in this sub-chamber and the pressure prevailing in the sub-chamber of constant pressure of the rear chamber adjacent to it tends to tear off the separating element. The latter therefore has to be fastened firmly to the front shell, thereby necessarily complicating the production of such a booster, while at the same time increasing its cost and reducing its reliability.

Moreover, since the front piston is downstream of the reaction disk and is fastened to the push rod, it does not participate in the reaction which the driver must feel as a function of the boost.

Finally, the return spring is seated in one of the sub-chambers and is therefore of reduced length. Its rigidity consequently has to be very high. Because of the broad spread of characteristics of springs of high rigidity, it is difficult for boosters having identical characteristics to be obtained in series.

U.S. Pat. No. 4,279,193 makes known a pneumatic brake booster of the tandem type, in which the annular partition of the separating element is locked in a peripheral zone projecting from the part in the form of a cylindrical ring of one of the shells. Consequently, the brake booster has a large volume, and moreover, in the event of pneumatic failure, the gasket between the separating element and the rear end of the front piston determines a resistance which the driver has to overcome.

SUMMARY OF THE INVENTION

An object of the present invention is to overcome all these disadvantages.

According to the invention, the annular partition of the separating element is simply put in place and bears on the bottom of the rear shell of the containment, and the two pistons are fixed to one another and to the movable hub.

Preferably, an orifice made in the rear end of the front piston puts the sub-chambers of constant pressure in communication, while communication is made between the sub-chambers of variable pressure in the region of the bearing point of the annular partition of the separating element on the rear shell.

BRIEF DESCRIPTION OF THE DRAWING

The invention will now be described by way of example with reference to the accompanying drawing in which:

the single FIGURE shows a booster according to the present invention diagrammatically in partial section.

DETAILED DESCRIPTION OF THE INVENTION

Referring now to the single FIGURE, the booster consists of a front shell 1 on the same side as the master cylinder (not shown) and of a rear shell 3 on the same side as the actuating pedal (not shown), which define a closed containment.

As an average person skilled in the art will have understood, the term "front" denotes the direction in which the movable components move during the actuation of the booster, and the term "rear" denotes the direction in which the same components move when they return to the rest position. In other words, the front is on the right in the FIGURE, on the same side as the master cylinder, and the rear is on the left in the FIGURE, on the same side as the actuating pedal.

A separating element 5 is arranged within the containment in order to define a front chamber and a rear chamber.

The front chamber is itself divided into two sub-chambers 21, 23 separated by a piston 25 and a sealing diaphragm 27. Likewise, the rear chamber is divided into two sub-chambers 31, 33 separated by a piston 35 and a sealing diaphragm 37.

The two pistons 25 and 35 are fixed to one another and to a movable hub 15 which drives a push rod 11 by means of a reaction disk 17, this hub 15 being returned to rest by means of a helical spring 19 bearing on the front shell 1.

The rear end 29 of the front piston 25 assumes the form of a hollow cylinder fastened to the hub 15, the spring 19 penetrating into this hollow cylinder so as to have the greatest possible length. A gasket 7 is arranged between the separating element 5 and this rear end 29 of the piston 25, to ensure the sealing of the sub-chamber 23 of variable pressure located between two sub-chambers 21, 31 of constant pressure. This rear end 29 of the piston 25 plainly passes through the sub-chamber 31 of constant pressure.

At least one orifice 30 is made in the rear end 29, to ensure communication between the two sub-chambers 21, 31 of constant pressure.

The separating element 5 comprises an annular partition 9 which is simply put in place and comes to bear on the rear shell 3. Preferably, in the example shown, communication is made between the two sub-chambers 23, 33 of variable pressure in the region 22 of the bearing point of the annular partition 9 on the rear shell 3.

Thus, when the two sub-chambers of constant pressure 21, 31 communicate with a vacuum source (not shown), for example a vacuum pump, and air is admitted into the sub-chambers of variable pressure 23, 33, the pistons 25 and 35 are driven towards the front under the effect of the pressure differences in the sub-chambers. However, these pressure differences then tend to reinforce the bearing of the annular partition 9 of the separating element 5 on the rear shell 3. This therefore provides a booster of the tandem type, in which the inner components do not tend to be torn off from one another. The production of such a booster is then greatly simpli-means for fastening the separating element 5 to one of the outer shells.

Furthermore, the two pistons duly participate in the reaction, and the return spring does not need to have a high rigidity which is the cause of a broad spread.

Finally, in the event of pneumatic failure, the separating element follows the piston and in no way opposes the movement.

An average person skilled in the art can, of course, make many modifications, without departing from the scope of the present invention, as defined by the accompanying claims.

In fact, the pressure called constant above is not necessarily constant. However, it must remain below (at work) or equal (at rest) to the pressure called variable above.

What we claim is:

1. A pneumatic brake booster of the tandem type for the brake boosting of motor vehicles, comprising a movable hub driving a push rod by means of a reaction disk, a closed containment composed of a front shell on the same side as a master cylinder and of a rear shell on the same side as an actuating pedal, both of which have a bottom and a cylindrical ring to define a front chamber and a rear chamber separated by a separating element having an annular partition, and a front piston and a rear piston, respectively arranged coaxially in the front and rear chambers which are respectively divided by a sealing diaphragm fixed to each of said pistons, in order to define, within each of the chambers, a sub-chamber of constant pressure and a sub-chamber of variable pressure, said pistons being movable in an axial direction under the effect of differences in the pressures prevailing between said sub-chambers of each chamber, said annular partition of said separating element resting nonattachably in place and bearing, as a result of pressure differentials between the respective sub-chambers, on a bottom of the rear shell of said containment during operation of said booster, the separating element able to move with the pistons away from said bottom of the rear shell during pneumatic failure, and said pistons fixed to one another and to said movable hub.

2. The brake booster according to claim 1, wherein a rear end of said front piston assumes the form of a hollow cylinder passing sealingly and slidably through a rear sub-chamber of constant pressure.

3. The brake booster according to claim 2, wherein a spring for return to rest arranged between said front shell and the hub penetrates into said rear end of the front piston.

4. The brake booster according to claim 2, wherein a gasket is arranged between said separating elements and said rear end of said front piston.

5. The brake booster according to claim 4, wherein at least one orifice made in said rear end of said front piston puts said sub-chambers of constant pressure in communication.

6. The brake booster according to claim 1, wherein communication is made between said sub-chambers of variable pressure in the region of a bearing point of the annular partition of said separating element on said rear shell.

* * * * *